United States Patent Office 3,265,685
Patented August 9, 1966

3,265,685
PROCESS FOR THE PREPARATION OF LACTAMS
Hans-Joachim Schultze, Chur, Grisons, Johann Giesen, Haldenstein, Grisons, and Clau Berther, Chur, Grisons, Switzerland, assignors to Inventa A.G. fur Forschung und Patentverwertung, Zurich, Switzerland
No Drawing. Filed Nov. 4, 1963, Ser. No. 321,286
3 Claims. (Cl. 260—239.3)

The present invention relates to the preparation of lactams.

It is known that when nitric oxides, particularly dinitrogentrioxide, act upon primary alcoholic hydroxyl groups in suitable solvents, carboxyl groups are formed. This oxidation reaction can also be effected if the carbon atom which carries the primary alcoholic hydroxyl group is linked to a tertiary carbon atom, as e.g. in the cycloaliphatic oxymethyl compounds of the type of oxymethylcyclohexane and its ring homologues.

It is further known that when nitrosating agents, preferably nitrosyl sulfuric acid, act upon cycloaliphatic carboxylic acids in a multiple step reaction in the presence of concentrated sulphuric acid and oleum, finally the lactam of that aminocarboxylic acid is formed which has one C-atom less than the starting compound.

Surprisingly it was found that a combination of these steps leads insofar to a significant simplification of lactam synthesis, as the different partial reactions may be carried out without interruption and without isolation of the intermediary products in the same reaction vessel, as a single step reaction as it were.

The process according to the invention for the preparation of lactams from carbinols having one cycloaliphatic substituent is characterized by treating said compounds at first with an oxidizing and simultaneously nitrosating agent, and subsequently converting the generated oximes in the reaction mixture into the corresponding lactams by treatment with oleum.

Suitable as nitrosating and at the same time oxidising agents are dinotrogentrioxide in presence of concentrated sulphuric acid, or nitrosyl sulphuric acid. The oximes generated from the carbinols having one cycloaliphatic substituent by treatment with those agents need not be isolated, but may be converted into the lactams of the aminocarboxylic acid with one C-atom less in the reaction mixture with oleum without any interruption of the reaction.

This reaction and the yields in lactams obtainable by it are all the more noteworthy when one takes into consideration what multiplicity of single reactions following each other occurs in the reaction mixture.

The process requires no particular or expensive equipment. As mentioned, the reaction can be carried out in two ways. If dinitrogentrioxide, i.e., an oxidizing and nitrosating agent is used, the operation of conversion occurs in a narrow high flask provided with a thermometer, a stirrer and, at its bottom end, with a frit or a gas-induction inlet. The hydroxymethylcyclo hydrocarbon is introduced first and heated to about 50° C. The reaction is started by slowly adding concentrated sulphuric acid from a dripping funnel under simultaneous blowing-in of dry dinitrogentrioxide. No additional heating of the reaction mixture is necessary, since the conversion is strongly exothermic. In the addition, sulphuric acid and dinitrogentrioxide are always used in equimolar quantities.

The reaction can be controlled by the rate at which more particularly the dinitrogentrioxide is added; for that purpose the reaction vessel is suitably dimensioned so that the quantities of inblown gas mixture of NO and $NO_2$ will cause the reaction mixture to maintain the desired temperature as well as the complete absorption of the dinitrogentrioxide. For quantities of 0.1–2.5 mols of the different hydroxymethylcycloalkanes with 6–12 ring carbon atoms, the reaction time amounts to 3–12 hours.

Since during the oxidation phase of the reaction a quantity of water corresponding to the oxidized alcohol is formed, that partly evaporates at the temperature of the reaction, it is advisable to remove the water as much as possible by using a suitable separator. In some cases, the reaction mixture tends to undesirable foam formation. This phenomenon may be prevented by adding minute quantities of a commercially available silicon oil. The molar ratio of the applied reaction partners oxymethylcycloalkane: dinitrogentrioxide: concentrated sulphuric acid is 1:2–5:1–3, preferably 1:2.5:2.5. Normally, the conversion occurs without the use of pressure at a temperature of 40–90° C., preferably 70–80° C.

If nitrosyl sulphuric acid is used for the oxidation and nitrosation of the hydroxymethylcycloalkanes, the conversion of the reaction partners is likewise carried out in a tube-shaped reaction vessel which is provided with a thermometer and a stirrer. The reaction temperature is kept at 30–60° C., preferably at 45–55° C., the conversion is considerably exothermic. The reaction time is 3–12 hours, in most cases however 5–8 hours, according to the kind of converted hydroxymethyl compound. The molar ratio oxymethylcycloalkane: nitrosylsulphuric acid is 1:1.5–3, preferably however 1:1.7–2.

After termination of the oxidation and simultaneous nitrosation by dinitrogentrioxide in presence of sulphuric acid or by nitrosyl sulphuric acid alone, which can be carried out discontinually or, alternatively, in suitable reaction vessels, continually, oleum in any concentration desired (10–60% is added, by which procedure and with simultaneous heating of the reaction mixture to 90–130° C., preferably to 100–110° C., the conversion of the generated oximes into the corresponding lactams is obtained.

For the recovery of the lactams from the total reaction mixture, the cooled mixture is poured under vigorous stirring into an approximately 10% solution of sodium hydroxide or ammonia, whereby the sulphuric acid and the carboxylic acids formed during the reaction, are neutralized. The salts formed are insoluble or sparingly soluble in water and separate in flocculent almost colorless form; they may be isolated through filtration. The processing of soluble lactams may be facilitated by additional extraction of the aqueous-alkaline solution with an inert solvent, e.g. chloroform, carbon-tetrachloride or ether. By once more acidifying the aqueous lactam mother liquor and extracting with one of the mentioned inert solvents, the cycloaliphatic carboxylic acid may be recovered, which had formed in the oxidation, but had not been further converted.

Since the hydroxymethylcycloalkanes with even C numbers are easily accessible on an industrial scale from the cyclic olefines, which, themselves are obtained from butadiene, ethylene or acetylene by means of hydroformylation, the process according to the invention is of particular interest, because the lactams obtained as end products are excellent and preferred starting materials for the extremely important polyamides.

Example 1

In a tube-shaped reaction vessel, which is open at the top and provided at the bottom with a gas inlet tube, at the center with a thermometer, at the top with a dripping funnel, and with a stirrer, 20 grams (0.11 mol) hydroxymethylcyclododecane (92.6%) are heated to 45° C. After reaching this temperature, a moderate current of pure dinitrogentrioxide (NO and $NO_2$ in the ratio 1:1) is blown from an ampulla over a drying tower through the inlet tube; at the same time the dropwise addition of 96–100% sulphuric acid is started. After about 10 minutes, the reaction is well under way, which is noticeable by the gradual rise of temperature in the reaction mixture. After the reaction has set in, frequently a gas evolution leading to marked foam formation is noted, which however can be considerably suppressed by adding a trace of common silicon oil. The addition of nitric gases and sulphuric acid is performed in such a way that the reaction temperature is maintained at 75–80° C. and no nitric gases will escape from the reaction vessel. After 3 hours, 22.6 grams dinitrogentrioxide (0.3 mol) and 25 grams sulphuric acid (2.5 mol) are converted and the addition is discontinued; instead, 20 grams oleum (60%) are added dropwise within 15 minutes. During the addition of oleum, vigorous gas formation is once more noted. After termination of the oleum addition, the mixture is heated to 110° C. and kept at this temperature for 45 minutes. The mixture is allowed to cool down and then poured under vigorous stirring and further external cooling into cold 10% sodium hydroxide or ammonia water, whereby the free acid may be neutralized and the crude lactam be separated in form of a yellowish to almost colorless precipitate of fine crystals.

Yield: 10.1 grams i.e. 54.6% calculated with reference to the hydroxymethylcyclododecane used.

In colorless products, a crystallization from acetic acid ester yields a dodecane lactam of high purity in colorless needles having a melting point of 151–153° C. If the crude lactam is not colorless, it is dissolved in 80% methanol water, if desired brightened with activated carbon, once more neutralized with sodium hydroxide or ammonia solution and then slowly poured into a considerable excess amount of boiling hot water.

This will lead to the separation of pure lactam in form of small colorless crystal needles which, when dried and recrystallized from acetic acid ester, will likewise yield dodecane lactam of high purity.

*Example 2*

In the apparatus described in Example 1, 10.8 grams (0.1 mol) of hydroxymethylcyclohexane are introduced first and heated to 60° C. under stirring. Then, 29.6 grams (0.3 mol) of 100% sulphuric acid are added dropwise during 3 hours, and 22.8 grams (0.3 mol) dinitrogentrioxide blown in. Owing to the liberated reaction heat, the temperature remains at 70–80° C. Thereafter, the mixture is left standing for an hour, whereby the reaction is carried to completion and finally 22 grams of 23% oleum are added in small portions, whereby the mixture again heats up considerably. By additional heating, the product is brought up to 100–110° C., whereby again moderate gas formation occurs. When no more gases are liberated, i.e. after about one hour, the dark brown viscid mass which by then has cooled down, in introduced under intensive stirring into such an amount of 10% sodiumhydroxide solution that the obtained solution is very slightly alkaline. After brightening the solution with a small amount of activated carbon, it is extracted by means of chloroform and finally 5.6 grams ε-caprolactam i.e. 49.6% of the theoretical value, calculated with reference to the introduced oxymethylcyclohexane, is obtained, F.P: 68–69° C.

*Example 3*

14.2 grams (0.1 mol) of hydroxymethylcyclooctane, 29.6 grams 100% sulphuric acid and 22.6 grams dinitrogentrioxide are reacted according to the method described in Examples 1 and 2 within 3½ hours at 70–80° C. After two more hours at room temperature, 22 grams of oleum (23% $SO_3$) are added and the mixture is heated for one hour up to about 100° C.

After processing according to the method described in Example 2, 4.05 grams capryl lactam (melting point of the recrystallized product: 73–75° C.), is obtained, which means a yield of 28.7% of the theoretical value, referring to the hydroxymethylcyclooctane used.

*Example 4*

14.2 grams (0.1 mol) of hydroxymethylcyclooctane are reacted with a total amount of 21.2 grams (0.17 mol) nitrosyl sulphuric acid during 6 hours in a tube-shaped reaction vessel provided with a stirrer. The reaction temperature is 45–50° C., at maximum 55° C.; the addition of nitrosyl sulphuric acid is carried out in small portions distributed over the entire reaction time. After each addition a very strong reaction is noticeable, the liberated heat has to be withdrawn, if necessary, by external cooling. After termination of the conversion with nitrosyl sulphuric acid, 22 grams oleum (24% $SO_3$) are added and the mixture is heated for 30 minutes to 95° C.

Processing occurs according to the method described in Example 2. 11.25 grams of crude capryl lactam are obtained from which 6.31 grams of pure capryl lactam may be isolated by distillation under reduced pressure. Yield: 44.4% referring to hydroxymethylcyclooctane used. $B.P._{0.4}$=113–115° C.

What is claimed is:

1. Process for the preparation of a lactam which comprises in a first stage reacting a primary hydroxymethyl cycloalkane having at least 6 ring carbon atoms with sulfuric acid containing simultaneous oxidizing and nitrosating agents to form an oxime, and in a second stage, after substantial completion of the oxime formation, adding oleum to the reaction mixture to convert the oxime to the corresponding lactam.

2. The process of claim 1 in which the oxidizing and nitrosating agent is dinitrogen trioxide and sulfuric acid.

3. The process of claim 1 in which the oxidizing and nitrosating agent is nitrosyl sulfuric acid.

References Cited by the Examiner

FOREIGN PATENTS 1,238,981    7/1960    France.

WALTER A. MODANCE, *Primary Examiner.*

ROBERT T. BOND, *Assistant Examiner.*